United States Patent
Esbensen

(10) Patent No.: US 8,164,492 B2
(45) Date of Patent: Apr. 24, 2012

(54) APPARATUS AND METHOD FOR FAST DATA ENCODING AND DECODING

(75) Inventor: Daniel Esbensen, Blue Diamond, NV (US)

(73) Assignee: Touch Technologies, Inc., San Diego, CA (US)

( * ) Notice: Subject to any disclaimer, the term of this patent is extended or adjusted under 35 U.S.C. 154(b) by 65 days.

(21) Appl. No.: 12/773,839

(22) Filed: May 4, 2010

(65) Prior Publication Data

US 2010/0283640 A1 Nov. 11, 2010

Related U.S. Application Data

(60) Provisional application No. 61/175,453, filed on May 4, 2009.

(51) Int. Cl.
*H03M 7/00* (2006.01)
(52) U.S. Cl. .............................. 341/106; 341/50; 341/51
(58) Field of Classification Search .................. 341/106, 341/68, 50, 51
See application file for complete search history.

(56) References Cited

U.S. PATENT DOCUMENTS

| | | | |
|---|---|---|---|
| 6,285,300 B1 * | 9/2001 | Colon-Bonet | 341/50 |
| 6,492,918 B1 * | 12/2002 | Rezzi et al. | 341/68 |
| 7,149,765 B2 | 12/2006 | Esbensen | |
| 7,245,238 B2 | 7/2007 | Luo | |
| 7,375,658 B2 | 5/2008 | Luo | |
| 7,389,529 B1 | 6/2008 | Enderwick et al. | |
| 7,561,079 B2 | 7/2009 | Luo | |
| 7,602,317 B2 | 10/2009 | Liu et al. | |
| 7,649,479 B2 | 1/2010 | Liu et al. | |
| 7,870,174 B2 | 1/2011 | Eadon et al. | |
| 2003/0152220 A1 | 8/2003 | He et al. | |
| 2008/0122663 A1 | 5/2008 | Luo | |

FOREIGN PATENT DOCUMENTS

| | | |
|---|---|---|
| EP | 1289151 A1 | 3/2003 |
| EP | 1696572 A1 | 8/2006 |
| JP | 11163733 | 6/1999 |
| WO | WO 99-34286 A1 | 7/1999 |

OTHER PUBLICATIONS

Base64—Wikipedia Article pp. 1-9.
Class Base26, pp. 1-13.
Abadi et al. (2006) "Integrating Compression and Execution in Column Oriented Database Systems," SIGMOD, pp. 1-12.

\* cited by examiner

*Primary Examiner* — Jean B Jeanglaude
(74) *Attorney, Agent, or Firm* — Quine Intellectual Property Law Group, P.C.; Stephen J. LeBlanc

(57) ABSTRACT

An improved method for encoding and decoding data, such as in a base64 system, uses multiple look-up tables to perform the encoding function and to eliminate or reduce bit-shifting and the bit masks in encoding systems through use of pre-populated look-up tables. One example application is converting between media data that is typically quickly viewable on a media device and ASCII or similar data useful in data transfers, such as email. In specific embodiments, a series of pre-fetch encode and decode tables are constructed and indexed to fetch pre-calculated values to, for example, rapidly encode and decode any number of bit representations into any other bit representations.

8 Claims, 5 Drawing Sheets

APPARATUS AND METHOD FOR FAST DATA ENCODING AND DECODING

CROSS REFERENCE TO RELATED APPLICATIONS

This application claims priority from provisional patent application 61/175,453, filed 4 May 2009 and incorporated herein by reference.

FIELD OF THE INVENTION

The present invention relates to information processing systems and methods. More particularly, the present invention is directed to methods and/or apparatus relating to handling image/video or other data for transmission, particularly image data or attachment data for email transmission. In particular embodiments, the invention may be understood as involving improved systems for handling Base64Encode/Decode functions in computer systems with applications to other encode or decode functions.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

Precautionary Request to File an International Application, Designation of all States, and Statement that at Least One Applicant is a United States Resident or Entity Should this document be filed electronically or in paper according to any procedure indicating an international application, Applicant hereby requests the filing of an international application and designation of all states. For purposes of this international filing, all inventors listed on a cover page or any other document filed herewith are applicants for purposes of United States National Stage filing. For purposes of this international filing, any assignees listed on a cover page or any other document filed herewith are applicants for purposes of non-United States national stage filing, or, if no assignee is listed, all inventors listed are applicants for purposes of non-United States national stage filing. For purposes of any international filing, applicants state that at least one applicant is a United States resident or United States institution. Should this application be filed in as a national application in the United States, this paragraph shall be disregarded.

APPENDIX

This application is being filed with paper appendices totaling 5 pages containing computer source code listings. These appendices and all other papers filed herewith, including papers filed in any attached Information Disclosure Statement (IDS), are incorporated herein by reference. The appendix contains further examples of source code listings and information related to various embodiments of the invention at various stages of development.

BACKGROUND OF THE INVENTION

A task that is commonly performed in computer systems is conversion of often large sets of data from one encoding system to another. Many different encoding approaches are known, but determining a optimal approach for encoding and decoding data in particular systems and situations is an often challenging task. Translating from a one code to a different code in most computer systems is a processor-intensive task.

One oft-used encoding scheme is base64, which is specified for use with email attachments, including files of many different types, such as images, sound, video, executable, document files, etc. The use of email with attachments is wide-spread—trillions of data bytes are base64 encoded and decoded each day, consuming vast quantities of CPU resources. Each email attachment generally consists of one or more base64 encoded segments.

Furthermore, typically, when a web browser client requests an image from a webserver, the webserver may find the image, base64 encode the image, and then sends the base64 encoded image data to the browser client. The browser then receives the base64 encoded image, decodes it, and displays it in the browser's window.

Thus, Base64 encoding and decoding is a method that allows binary data to be transported from one place to another by first converting the binary data to "human readable text" and then sending the data. On the receiving side the "human readable text" is converted back into the original binary data. Base64 encoding and decoding is specified by an international standard whenever emails contain attachments. For example, see the discussion at http(://)email(.)about(.) com/cs/standards/a/mime.htm.

The table below (adapted from Wikipedia) shows how three binary bytes are encoded into four base64 digits in one example encoding scheme. Note that any arbitrary bit stream can be encoded 24 bits at a time into Base64, but for this example, is shown three byte values (24 bits) of "M", "a", and "n" for simplicity. However, the "M," "a" and "n" are more correctly and generally understood as standing for their corresponding 8-bit patterns as shown, since Base64 encoding is often used for non-text attachments, such as images.

|  | c1 | c2 | c3 |
|---|---|---|---|
| Text content | M | a | n |
| ASCII | 77 | 97 | 110 |
| Bit pattern | 0 1 0 0 1 1 0 1 | 0 1 1 0 0 0 0 1 | 0 1 1 0 1 1 1 0 |
| Index | 19 | 22 | 5 | 46 |
| Base64-Encoded | T | W | F | u |
|  | x1 | x2 | x3 | x4 |

Traditional base64 encode/decode methods use a series of bit-shifts and bit masks to both encode and decode. Some methods use small "helper" tables, but still have to bit-shift and bitmask. While the above table makes the task appear straight forward, in practice it is not. Bit-shifting and bit-masking is required because while the Base-64 encoded data is logically encoded into 6-bit values, those values are converted into 8-bit values in order to be handled by standard digital processing and transmission.

SUMMARY OF THE INVENTION

The present invention in various embodiments entails a method and/or apparatus and/or digital logic circuit for dramatically improving Base64 encoding and decoding. In specific embodiments, the invention can eliminate completely both the bit-shifting and the bit masks. The invention accomplishes this through the careful use of pre-populated look-up tables as described herein. In initial experiments, speed improvements of 300% to 500% can be achieved in current computing systems when converting between image data that is typically quickly viewable on a computer screen or other image display device and ASCII or similar data useful in data transfers, such as email.

In specific embodiments, a series of pre-fetch encode and decode tables are constructed. By indexing these tables and fetching pre-calculated values, all bit-shifting and bit masking is eliminated giving substantial speed improvements over all known prior implementations.

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

The functional aspects of the invention that are implemented on a computer, as will be understood from the teachings herein, may be implemented or accomplished using any appropriate implementation environment or programming language, such as Python, Pert, C#, C++, Cobol, Pascal, Java, Java-script, assembly or machine code programming, custom logic circuits, etc. All references, publications, patents, and patent applications cited herein are hereby incorporated by reference in their entirety for all purposes.

In various embodiments, the invention involves handling data that is presented to a user as an useful output, such as a screen display of an image or text. Such outputting of digital data is understood in the art and examples are provided herein.

DESCRIPTION OF SPECIFIC EMBODIMENTS

Overview

Specific embodiments of the invention increase the number of email attachments that can be processed per second by a computer system and can also increase the number of images that can be sent per second between a server and a browser by a computer system. Thus, specific embodiments speed up the base64 encoding and decoding of the email attachments and/or speed up the base64 encoding and decoding between web servers and web browsers. Huge performance gains according to specific embodiments occur by completely eliminating both the bit-shifting and the bit masks through the use of pre-calculated table data. Because this invention uses lookup tables, as CPU L1 caches become larger, the speed improvements over traditional methods will increase as well.

This invention is not limited to base64 encoding and decoding. The use of fully pre-calculated lookup tables can be used to rapidly encode and decode any number of bit representations into any other bit representations by changing the size of the tables, the number of tables, and pre-calculated values stored in the tables.

General Methods

Figure 1:
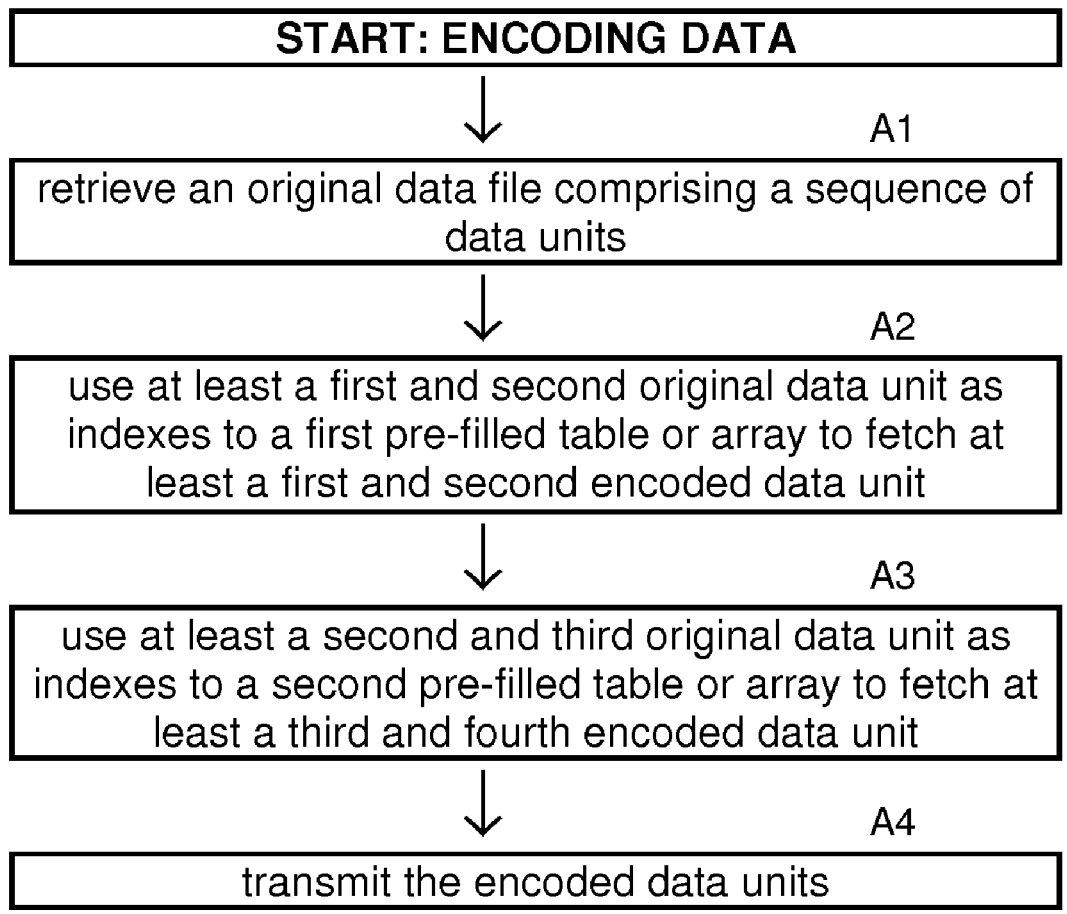
FIG. 1 is a flow chart illustrating a general encode method according to specific embodiments of the invention.
Figure 2:
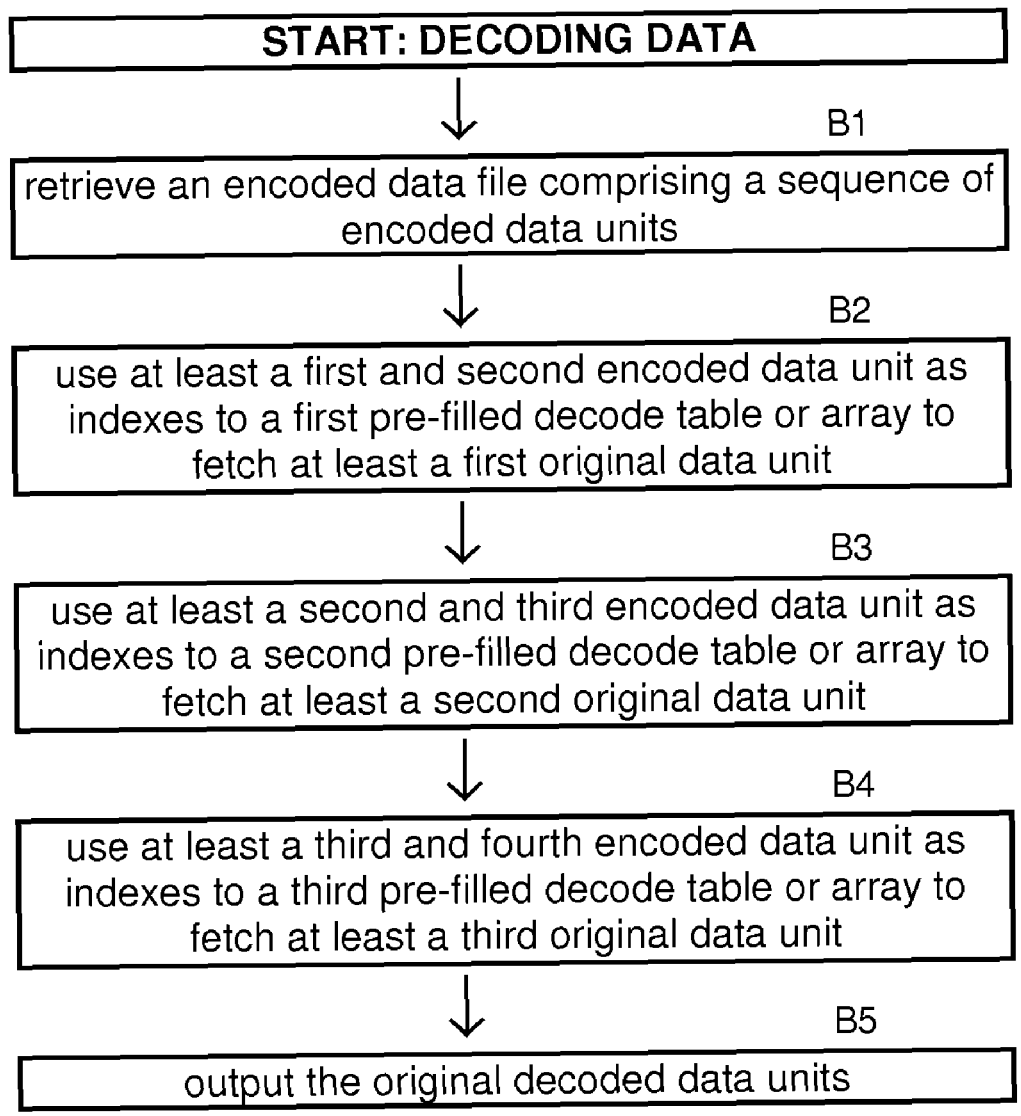
FIG. 2 is a flow chart illustrating a general decode method according to specific embodiments of the invention.
Figure 3:
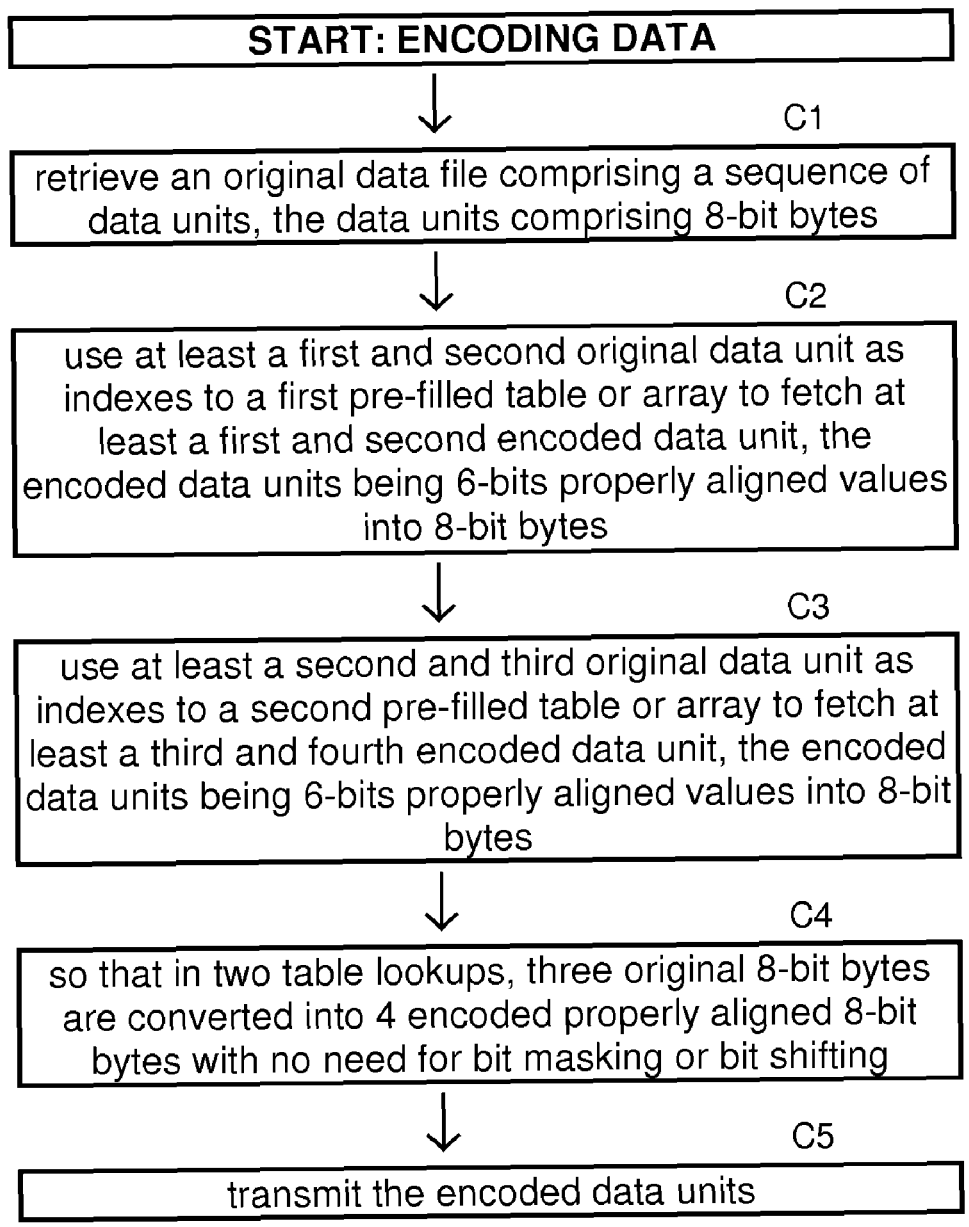
FIG. 3 is a flow chart illustrating an encode method specifying bit alignment characteristics for Base64 encoding according to specific embodiments of the invention.

FIG. 1 is a flow chart illustrating a general encode method according to specific embodiments of the invention. As shown in the figure, the invention can be embodied in a logical method suitable for implementation by any appropriately configured information handling system, including general purpose computing systems and information handling displays and subsystems. FIG. 2 is a flow chart illustrating a general decode method according to specific embodiments of the invention. FIG. 3 is a flow chart illustrating an encode method specifying bit alignment characteristics for Base64 encoding according to specific embodiments of the invention.

According to specific embodiments, the invention also involves the pre-filled table sets as described herein, specific examples of which can be generated according to the logic routines provided herein.

According to specific embodiments, an encode table set will include two or more tables. For ease of look-up, in specific embodiments, both tables are effectively 2-dimensional arrays, indexed on one axis according to a first original value and on a second axis according to a second original value. The output of the lookup, or values stored at each array location, are 2 8-bit bytes, each containing a 6-bit Base64 code. The 8-bit bytes that are output are already bit-masked and aligned, so no processing action is required after the values are fetched from memory. Two arrays are used to increase encoding speed, with one of the original values (for example, the middle value in each triplet) used in both the first table and second table lookup. One example implementation of a Base64 encode therefore requires 2 arrays, each 256× 256, with each array location holding 2 eight-bit bytes. Various modifications can be made according to specific embodiments, but the just described embodiment has been found in many situations to provide a substantial encoding speedup at an acceptable cost in working memory to usage.

Example Embodiments

The present invention has thus far been described in terms of general embodiments. The previous description is believed to be a full and complete description sufficient to allow a practitioner in the art to make and use the invention. It will be understood to those of skill in the art from the teachings provided herein that the described invention or components thereof can be implemented in a wide variety of specific programming environments and logical systems (such as UNIX, Windows, Solaris, Oracle, etc.) using a wide variety of programming languages (such as SQL, Visual Basic, Pascal, C++, Basic, Java, JavaScript, etc.) and wide variety of file formats.

What follows are descriptions of example systems and methods that are involved with or may embody various aspects of the present invention. This following discussion is included, in part, in order to disclose particularly preferred modes presently contemplated for practicing the invention. The following discussion may also include independent innovative embodiments of the invention. It is intended, however, that the previous discussion and the claims not be limited by examples provided herein. It is further intended that the attached claims be read broadly in light of the teachings provided herein. Where specific examples are described in detail, no inference should be drawn to exclude other examples or to exclude examples described or mentioned briefly from the broad descriptions of the invention provided herein. It is therefore intended that the invention not be limited except as provided in the attached claims and equivalents thereof.

Example Encoding

According to specific embodiments, a series of pre-calculated encode and decode tables are constructed in an accessible memory (such as CPU cache memory or RAM). By indexing these tables and fetching pre-calculated values, all bit-shifting and bit masking is eliminated giving substantial speed improvements over all known prior implementations.

As a particular example, consider encoding "Man" into the base64 digits of "TWFu" as described above. According to specific embodiments, two encoding tables are built in memory prior to encoding. These tables may be kept in working memory or can be reconstructed as described herein each time encoding is performed and as is convenient.

In this example, the first encoding table is indexed by the first value (in this example, "M") and the second value ("a"). For simplicity, these values may also be referred to as ch1 and ch2. The intersection of the first table contains the encoded result values (in this example "TW"). The second encode table is indexed by the second value (ch2 or "a") and the third value (ch3 or "n") and contains at that intersection the encoded result values "Fu".

In this example, when fully created, these first and second tables each contain 256*256 memory locations—one location for each character pair ((ch1, ch2) or (ch2,ch3)). Each memory location contains the two pre-calculated base64 bytes, e.g., "TW" or "Fu."

The following pseudo-code provides an example of the pre-calculated tables being used to encode ASCII into base64. In this example the tables are named base64_fast1 and base64_fast2:

```
// Use the encoding tables to encode two bytes at a time
// The fast1 table does the first two bytes
two_bytes = base64_fast1[(ch1,ch2];
two_byte_dest = (unsigned short*)(dest+result_len);
*two_byte_dest = two_bytes;
// The fast2 table does the last two bytes
two_bytes = base64_fast2[(ch2,ch3];
two_byte_dest = (unsigned short*)(dest+result_len+2);
*two_byte_dest = two_bytes;
result_len = result_len + 4;
```

Example Decoding

As a particular example, consider decoding the example above of base64 digits of "TWFu" into "Man". According to specific embodiments, three decoding tables are built in memory prior to decoding. These tables may be kept in working memory or can be reconstructed as described herein each time encoding is performed and as is convenient.

In this example, the first decoding table is indexed by the first value (in this example, "T"). and the second value ("W") and contains at the intersection the result of "M". These values will be referred to at times herein as x1 and x2. The second decode table is indexed by x2 ("W") and x3 ("F") and contains at the intersection the result of "a". The third decode table is indexed by x3 ("F") and x4 ("u") and contains at the intersection the result of "n".

The following pseudo-code provides an example of the pre-calculated tables being used to decode base64 into ASCII. In this example the pre-calculated decode tables are named base64_decode1, base64_decode2, and base64_decode3:

```
dest[result_len] =        base64_decode1[x1,x2];
dest[result_len+1] =      base64_decode2[x2,x3];
dest[result_len+2] =      base64_decode3[x3,x4];
```

Example Creation of Tables

Tables:

The following pseudo-code provides an example of code that can create the pre-calculated tables. Ideally these tables would be used to generate STATIC READ-ONLY tables that would be highly cachable by the CPU.

```
static char base64digits[ ] =
"ABCDEFGHIJKLMNOPQRSTUVWXYZabcdefghijklmnopqrstuvwxyz0123456789+/";
BOOL base64_init = FALSE;
char base64_decodetable[256];
unsigned short base64_fast1[256*256];
unsigned short base64_fast2[256*256];
uchar base64_decode1[64*64];
uchar base64_decode2[64*64];
uchar base64_decode3[64*64];
void do_base64_init( )
{ int i,j;
    unsigned char ch1,ch2;
    long encoded_long;
```

-continued

```
    for (i=0; i<256; i++)
        base64_decodetable[i] = -2;
    for (i=0; i<64; i++)
    {
        base64_decodetable[base64digits[i]] = (char) i;
        base64_decodetable[base64digits[i]|0x80] = (char) i;
    }
    base64_decodetable['='] = 0; // was -1
    base64_decodetable['='|0x80] = 0; // was -1
// The three characters "abc" generate four base64 characters.
// We do this by making two sets of two base64 characters each.
// So, we make two tables... one for "ab" and one for "bc" as the
// positions make a difference
// Here is the first table--> "ab"
    for (i=0; i<256; i++)
        {for (j=0; j<256; j++)
            { encoded_long = ((i << 8) + j) << 8; // push bits to the correct
positions
            encoded_long = encoded_long >> 12; // just to be clear that we skip
the first 2 characters
            ch2 = base64digits[encoded_long & 63];
            encoded_long = encoded_long >> 6;
            ch1 = base64digits[encoded_long];
            base64_fast1[i*256+j] = (unsigned short)(ch1 + 256*ch2);}}
// And here is the 2nd table for "bc"
for (i=0; i<256; i++)
    { for (j=0; j<256; j++)
        { encoded_long = ((i << 8) + j); //
        ch2 = base64digits[encoded_long & 63];
        encoded_long = encoded_long >> 6;
        ch1 = base64digits[encoded_long & 63];
        base64_fast2[i*256+j] = (unsigned short)(ch1 + 256*ch2);}}
```

Example of Constructing Decode Tables

```
// with four base64 digits making three characters, we need
// three tables. "abcd" --> "ab", "bc", "cd"
    for (i=0; i<64; i++)
        { for (j=0;j<64;j++)
            { ch1 = base64digits[i];
            ch2 = base64digits[j];
            encoded_long = ((j) + (i << 6));
            base64_decode3[i*64+j] = (char)(encoded_long & 255);
            encoded_long = ((j << 6) + (i << 12));
            encoded_long = (encoded_long >> 8);
            base64_decode2[i*64+j] = (char)(encoded_long & 255);
            encoded_long = ((j << 12) + (i << 18));
            encoded_long = (encoded_long >> 16);
            base64_decode1[i*64+j] = (char)(encoded_long &
            255);}}
            base64_init = TRUE;}
```

Other Implementation Details

It will be understood from the teachings provided herein, that a method according to the present invention can be variously implemented in computing systems. In one implementation, computer-understandable logic instructions related to the present invention can be included in an application program and/or can be invoked by an application program during initiation and/or execution.

In specific embodiments, such a system can be initiated by a logic routine during program initiation or operating system initiation. It will further be understood from the teachings herein, that logic routines according to the present invention can be included in a logic instruction compiler or logic instruction interpreter and/or include or other files associated with such a programming environment.

Embodiments in an Information Processing Architecture

As discussed herein, according to specific embodiments, the present invention can be embodied in a method implemented on an information handling system, such as a computer or a variety of other devices that include information handling functionality. Such other devices can include, but are not limited to, personal digital assistants (PDAs), cellular telephones, television set top systems or cable systems interfaces, toys, home appliances with information handling abilities, scientific and diagnostic systems, and machinery or industrial systems with information handling abilities.

Typically, information handling in such systems is performed by binary logic circuits. According to further specific embodiments, the present invention can be embodied in either an information handling system or circuitry or components of an information handling system performing according to the description herein.

According to further specific embodiments, the invention can be embodied as one or more sets of instructions and/or data that are used to program or guide or affect the operation of an information handling system. As is known in the art, these sets of instructions and/or data can be distributed to users stored or recorded on a storage medium, such as a disk, diskette, hard-drive, CD-ROM, tape, ROM, EPROM, ASIC, PLD, etc., and according to specific embodiments, the invention can be embodied as such a medium storing data and/or instructions that when loaded into an appropriately configured information system will cause the system to performing according to the description herein.

As is further known in the art, sets of instructions and/or data can be transmitted to an information handling system over a communication medium (such as the internet, a local area network, a wireless network, a telephone line, a cable-television system, etc.) from a remote data holding location (such as a server) and thereby when loaded into an appropriately configured information system will cause the system to performing according to the description herein.

Figure 4:
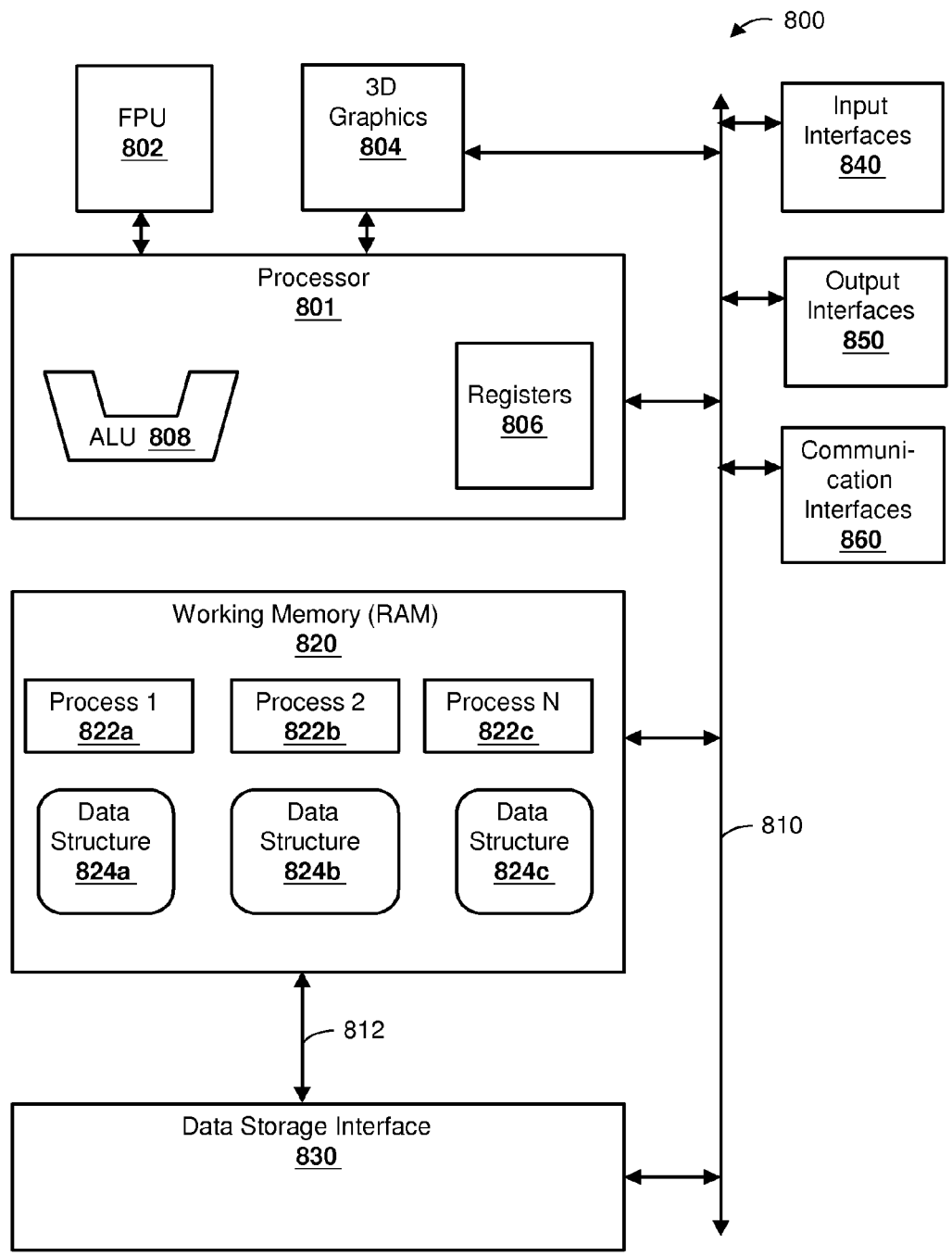
FIG. 4 illustrates an example architecture of an example information handling system relevant to various specific embodiments of the present invention.

FIG. 4 illustrates an example architecture of an example information handling system relevant to various specific embodiments of the present invention. As will be understood to those of skill in the art and from the teachings provided herein, the general organization of a system 800 as shown in FIG. 4 is representative of various information systems ranging from computer-on-a-chip type circuits in a household appliance or toy to super computer systems and distributed systems. In some information handling systems, the various components shown in FIG. 4 may be separable computer chips or separable circuit areas on a computer chip, whereas in other information handling systems, some or all of the functions shown in FIG. 4 will be performed by shared circuitry or implemented in software. Some systems will not have all of the components shown in FIG. 4, and other systems will have additional core components. FIG. 4 does not represent the only device architecture on which the present invention can be performed and it will be understood that the present invention is applicable to a variety of types of information processing devices.

An information handling device typically includes one or more processors, such as 801. Processor 801 is generally characterized as being able to perform different logic operations on data, where logic operations are selected or specified by one or more instructions. In the example of a personal computer system or workstation, processor 801 can represent any of the number of well-known microprocessors manufactured by companies such as Intel, AMD, Zilog, and Motorola. Processor 801 can also represent a subset of circuitry configured as a processor in an integrated circuit such as an ASIC or PLD.

A processor 801 can at times work in cooperation with other information handling circuits (which may or may not also be processors) that may have special-purpose abilities. These circuits may be external from the processor or internal with the processor. As an example, FIG. 4 shows a floating point unit (FPU) 802 and a 3D graphics module 804. A processor 801 may also have a number of structures to facilitate its operation, such as, for example, a set of internal registers 806 and/or an arithmetic logic unit (ALU) 808. In some processors, these structures are internal to the processor circuitry.

In most information handling systems, various modules communicate with other modules over one or more communication paths or buses. FIG. 4 shows a representative system bus 810 and a separate auxiliary bus 812. The illustrated buses can represent signal channels on an integrated circuit, communication connections on a printed circuit board, connection between two or more printed circuit board or a backplane, or any other channels used by the modules to exchange data or control signals.

In various information processing systems, separable modules can include such things as working memory 820, one or more storage systems 830, one or more input interfaces 840, one or more output interfaces 850. Some information systems also include a communication interface (such as a network interface or a modem) 860 for communicating with other computer systems, such as over a network. These modules are shown in FIG. 4 as broadly representative of aspects of a computing system.

In typical information processing systems, working memory 820 is some type of random access memory (RAM) that can be quickly accessed by processor 801 and possibly by other processors. In general purpose computers and other computer systems, during operation, such a working memory contains the data and instructions for one or more processes 822, including operating system processes. Each process generally represents an executing program or program thread. Working memory 820 can also include one or more data structures 824, which may be associated with particular processes or may be shared or system-wide. These data structures can include data tables or any other data structures that can be represented in digital memory. Therefore, in many general purpose information processing systems (such as personal computers) working memory 820 will be understood in the art as containing resident parts of an operating system and/or of various application systems and/or data files and/or other logic modules or digital data.

As is familiar to those skilled in the art, an information processing system that is a general purpose type computer system further generally includes an operating system and at least one application program. The operating system is a set of logic instructions that control the computer system's operation and the allocation of resources. The application program is a set of logic instructions (possibly also including data) to perform tasks desired by the user. During operation, both may be resident in a memory system such as 820.

Storage 830 is illustrated to represent other, usually more long-term (also called non-volatile) data storage. In general purpose computers, this typically includes one or more disk-type systems (such as hard-disk drives, floppy drives, CD-ROMs, etc.) and can also include a variety of other storage devices. Storage 830 can be used to supplement working memory 820 through a variety of known paging techniques. Storage 830 can also include remote storage systems available over a network. In hand-held devices especially, storage 830 may consist sole of read-only-memory (ROM) used to store executable components of the system. Depending on particular implementations, 830 can represent either storage systems that are part of computer system 800 or an interface to external storage systems.

Input interfaces 840 can represent circuits, devices, and/or logic or instructions that can provide for video, audio, keyboard, pointer, other input to a computer system. Typical input devices include such things as a keyboard or keypad, touch-screen, mouse, microphone, camera, environmental sensors (e.g. a thermostat or a motion detection), etc. Input interfaces 840, along with possibly other modules in the computer system, handle tasks involved in translating external data (such as key strokes) to the appropriate encoded data (typically binary data). These translation tasks can involve multiple steps, performed in various parts of a computer system. Depending on particular implementations, 840 can represent input devices and associated interface logic or only interface logic to particular input devices.

Output interfaces 850 represents circuits, devices, and/or instructions that can provide for video, audio, print or other output from a computer system and can also represent actual output devices. Typical output devices include a display screen, a printer, a speaker, etc. Output can also be in the form of control signals to an external machine such as an engine, manufacturing robot or other computer-controlled device. Output interfaces 850, along with possibly other modules in the computer system, handle tasks involved in translating computer encoded data (typically binary data) to the appropriate form for output. These translation tasks can involve multiple steps, performed in various parts of a computer system. A display of base64 encoded data, for example, typically requires a conversion from encoded values to a series of original values. These character codes are then further translated by display driver circuits to produce the electrical signals needed to excite various pixels on a CRT or LCD type display.

Communication interfaces 860 represents circuits, devices, and/or instructions that allow a computer system to communicate with other information handling systems, such as over a telephone dial-up connection or over the world-wide internet.

In accordance with the practices of persons skilled in the art of computer programming, the invention according to specific embodiments is described herein with reference to symbolic representations of operations that are performed by an information processing system. Such operations are sometimes referred to as being computer-executed or processor-executed. It will be appreciated that the operations that are symbolically represented include the manipulation by a CPU or other logic circuitry of electrical signals representing data bits and the maintenance of data bits at memory locations in a memory system, as well as other processing of signals. The memory locations where data bits are maintained are physical locations that have particular electrical, magnetic, optical, or organic properties corresponding to the data bits.

Thus, it will be understood from the teachings herein that the present invention can, according to specific embodiments, be embodied into an information handling system and/or into different separable components of an information handling system.

Embodiments in a Programmed System

Figure 5:
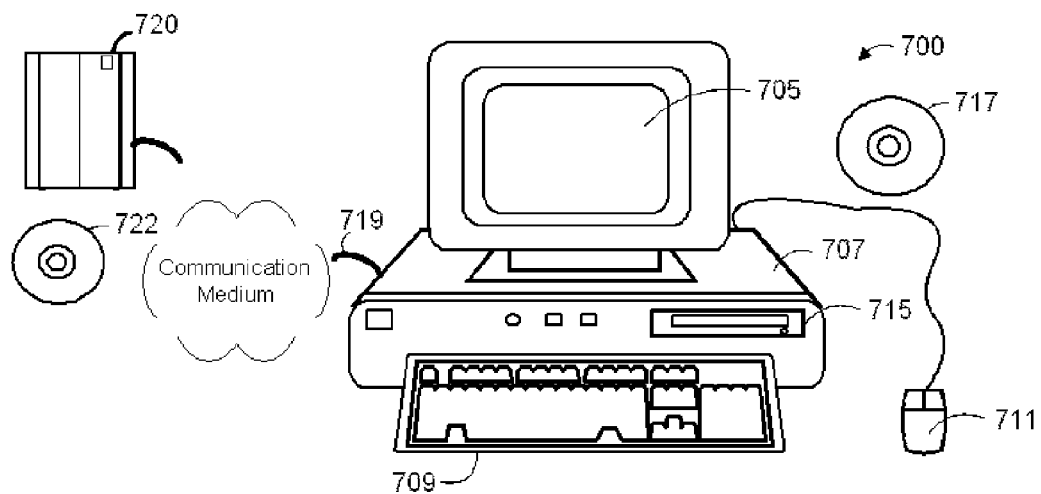
FIG. 5 is a block diagram showing a representative example logic device in which various aspects of the present invention may be embodied.

FIG. 5 is a block diagram showing a representative example logic device in which various aspects of the present invention may be embodied. The invention can be implemented in hardware and/or software. In some embodiments of the invention, the invention can be implemented entirely or in part in a client device or a server device, so long as both the client and server are capable of accepting a secondary channel. The invention may be embodied in a fixed media or transmissible program component containing logic instructions and/or data that when loaded into an appropriately configured computing device cause that device to perform according to the invention.

FIG. 5 shows digital device 700 that may be understood as a logical apparatus that can read instructions from media 717 and/or network port 719. Apparatus 700 can thereafter use those instructions to direct a server or client application as is known in the art and that further includes the components of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media or a memory. The invention may be embodies in whole or in part as software recorded on this fixed media. Communication port 719 may also be used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described.

Other Embodiments

The invention has now been explained with reference to specific embodiments. Other embodiments will be apparent to those of skill in the art. In particular, the client's digital computing device has been illustrated as a personal computer. However, the digital computing device is meant to be any device for interacting with a remote application, such as a multimedia messaging server.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of encoding original data into encoded data using an information processing apparatus comprising:
   encoding original data values by:
   constructing a first encode table indexed by possible values of first and second original characters and having at each intersection two corresponding values of encoded data;
   constructing a second encode table indexed by possible values of second and third original characters and having at each intersection two corresponding values of encoded data;
   alternately using the first and second encode tables to encode a sequence of original data values into a sequence of encoded data values;
   decoding encoded data by:
   constructing a first decode table indexed by possible values of first and second encoded characters and having at each intersection one corresponding value of original data;
   constructing a second decode table indexed by possible values of a second and third encoded characters and having at each intersection one corresponding value of original data;
   constructing a third decode table indexed by possible values of a third and fourth encoded characters and having at each intersection one corresponding value of original data;
   using the first second and third decode tables in order in round robin fashion to decode a sequence of encoded data values into a sequence of encoded data values;
   presenting said original values using a computer system to a user;
   wherein each table is stored in a computer memory and constructing and encoding and decoding are performed by a computer logic processor.

2. The method of claim 1 further wherein:
   the original data is 8-bit bytes;
   the encoded data is 6-bit characters.

3. The method of claim 1 further wherein:
   the original data represents one or more of text data, image data, sound data, executable data;
   the encoded data represents printable characters.

4. An apparatus in a computing system converting original data into encoded data comprising:
   a first encode table indexed by possible values of first and second original characters and having at each intersection two corresponding values of encoded data;
   a second encode table indexed by possible values of second and third original characters and having at each intersection two corresponding values of encoded data;
   a first decode table indexed by possible values of first and second encoded characters and having at each intersection one corresponding value of original data;
   a second decode table indexed by possible values of a second and third encoded characters and having at each intersection one corresponding value of original data;
   a third decode table indexed by possible values of a third and fourth encoded characters and having at each intersection one corresponding value of original data;
   a processor able to receive original or encoded data and use these data to look-up corresponding values in the tables.

5. An apparatus according to claim 4 further comprising a display for presenting results to a user.

6. A method allowing an information handling system with an information processor comprising logic circuits to more quickly execute programs on the processor requiring conversion of original digital data to encoded digital data comprising:

providing a logic module configured to construct a plurality of lookup tables in a memory of said information handling system, said memory and said lookup tables readable by said processor, said lookup tables indexed by two or more original values with entries in said lookup tables representing two or more encoded values; and providing a logic module configured to establish a logic routine that executes on said processor and causes said processor to accept original values and to use said lookup tables to determine display codes for said encoded values.

7. A method according to claim 6 wherein constructing a plurality of lookup tables in a memory of said information handling system comprises:

constructing a static lookup table in an operating system memory space of said information handling system.

8. A method according to claim 6 further comprising:

providing a logic module configured to construct one or more lookup tables during run-time execution of an application in an application memory space of said computer wherein said lookup tables are indexed by at least two original values and wherein entries in said lookup table represent two or more encoded values that are masked and aligned and ready for transmission or inclusion in an encoded data file.

* * * * *